(12) United States Patent  (10) Patent No.: US 7,814,676 B2
Sampica et al.  (45) Date of Patent: Oct. 19, 2010

(54) ALIGNMENT SYSTEM AND METHOD THEREOF

(75) Inventors: James D. Sampica, Springville, IA (US); Paul R. Nemeth, Cedar Rapids, IA (US); Tracy J. Barnidge, Marion, IA (US); Vincent P. Marzen, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 287 days.

(21) Appl. No.: 12/009,373

(22) Filed: Jan. 18, 2008

(65) Prior Publication Data

US 2009/0183381 A1 Jul. 23, 2009

(51) Int. Cl.
G01D 21/00 (2006.01)
(52) U.S. Cl. ............... 33/645; 33/613
(58) Field of Classification Search .......... 33/613, 33/645, 616, 619–621, 623, 533, 562, 563, 33/566, 568, 573, 297; 156/64, 362, 363, 156/378
See application file for complete search history.

(56) References Cited

U.S. PATENT DOCUMENTS

| | | | |
|---|---|---|---|
| 5,566,840 A * | 10/1996 | Waldner et al. | 211/41.17 |
| 5,592,288 A | 1/1997 | Sampica et al. | |
| 6,388,724 B1 * | 5/2002 | Campbell et al. | 349/122 |
| 6,614,057 B2 | 9/2003 | Silvernail et al. | |
| 6,803,245 B2 | 10/2004 | Auch et al. | |
| 6,984,545 B2 | 1/2006 | Grigg et al. | |
| 6,998,648 B2 | 2/2006 | Silvernail | |
| 7,273,403 B2 * | 9/2007 | Yokota et al. | 445/25 |
| 7,381,110 B1 | 6/2008 | Sampica et al. | |
| 7,435,311 B1 | 10/2008 | Marzen et al. | |
| 7,452,258 B1 | 11/2008 | Marzen et al. | |
| 2005/0126679 A1 * | 6/2005 | Kim | 156/64 |
| 2006/0245171 A1 * | 11/2006 | Kim et al. | 361/752 |
| 2009/0120572 A1 * | 5/2009 | Sampica et al. | 156/285 |
| 2009/0120585 A1 * | 5/2009 | Sampica et al. | 156/382 |

FOREIGN PATENT DOCUMENTS

| | | |
|---|---|---|
| EP | 0556351 B1 | 8/1993 |
| EP | 0711103 B1 | 5/1996 |
| JP | 1-210328 A | 8/1989 |
| JP | 5-200880 A | 8/1993 |
| JP | 5-293895 A | 11/1993 |

(Continued)

OTHER PUBLICATIONS

U.S. Appl. No. 12/009,482, filed Jan. 18, 2008, Barnidge et al.

(Continued)

*Primary Examiner*—Amy Cohen Johnson
(74) *Attorney, Agent, or Firm*—Matthew J. Evans; Daniel M. Barbieri

(57) ABSTRACT

A method for alignment comprises calculating the proper alignment position for a plurality of planar items based on at least one datum per planar item of the plurality of planar items, instructing a tooling system to form a tooling aid for providing the proper alignment position in a planar substrate lamination apparatus, and inserting the tooling aid into the planar substrate lamination apparatus for the proper alignment of the plurality of planar items in the planar substrate lamination apparatus.

18 Claims, 16 Drawing Sheets

FOREIGN PATENT DOCUMENTS

| | | |
|---|---|---|
| JP | 6-051484 A | 2/1994 |
| JP | 9-057779 A | 3/1997 |
| JP | 10-156853 A | 6/1998 |
| JP | 10-244589 A | 9/1998 |
| JP | 2000-141388 A | 5/2000 |
| JP | 2004-233590 A | 8/2004 |
| JP | 2006-218658 A | 8/2006 |
| JP | 2006-334912 A | 12/2006 |
| JP | 2007-206559 A | 8/2007 |
| JP | 2008-238607 A | 10/2008 |
| WO | PCT/US92/07118 | 3/1993 |

OTHER PUBLICATIONS

U.S. Appl. No. 12/009,472, filed Jan. 18, 2008, Sampica et al.
U.S. Appl. No. 12/009,393, filed Jan. 18, 2008, Sampica et al.
U.S. Appl. No. 12/009,375, filed Jan. 18, 2008, Sampica et al.
U.S. Appl. No. 12/009,372, filed Jan. 18, 2008, Sampica et al.
U.S. Appl. No. 11/214,518, filed Aug. 30, 2005, Sampica et al.
Geoff Walker, GD-Itronix Dynavue Technology: The Ultimate Outdoor-Readable Touch-Screen Display, Rugged PC Review, , pp. 1-4, Publisher: Rugged PC Review, Published in: US.

* cited by examiner

ALIGNMENT SYSTEM AND METHOD THEREOF

CROSS-REFERENCE TO RELATED APPLICATIONS

The present application is related to and claims the benefit of earliest available effective filing date(s) from the following listed application(s) (the "Related Applications") (e.g., claims earliest available priority dates for other than provisional patent applications; claims benefits under 35 USC §119(e) for provisional patent applications), and incorporates by reference in its entirety all subject matter of the following listed application(s); the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:

1. U.S. patent application entitled "SYSTEM AND METHOD FOR DISASSEMBLING LAMINATED SUBSTRATES," naming James D. Sampica as the first named inventor, sent via Express Mail Envelope Number EM 117 518 675 US, filed on Jan. 18, 2008, which is currently co-pending, or is an application of which a currently co-pending application is entitled to the benefit of the filing date.
2. U.S. patent application entitled "SUBSTRATE LAMINATION SYSTEM AND METHOD," naming James D. Sampica as the first named inventor, sent via Express Mail Envelope Number EM 117 518 596 US, filed on Jan. 18, 2008, which is currently co-pending, or is an application of which a currently co-pending application is entitled to the benefit of the filing date.
3. U.S. patent application entitled "SUBSTRATE LAMINATION SYSTEM AND METHOD," naming James D. Sampica as the first named inventor, sent via Express Mail Envelope Number EM 117 518 605 US, filed on Jan. 18, 2008, which is currently co-pending, or is an application of which a currently co-pending application is entitled to the benefit of the filing date.
4. U.S. patent application entitled "SYSTEM AND METHOD FOR COMPLETING LAMINATION OF RIGID-TO-RIGID SUBSTRATES BY THE CONTROLLED APPLICATION OF PRESSURE," naming James D. Sampica as the first named inventor, sent via Express Mail Envelope Number EM 117 518 640 US, filed on Jan. 18, 2008, which is currently co-pending, or is an application of which a currently co-pending application is entitled to the benefit of the filing date.
5. U.S. patent application entitled "PLANARIZATION TREATMENT OF PRESSURE SENSITIVE ADHESIVE FOR RIGID-TO-RIGID SUBSTRATE LAMINATION," naming James D. Sampica as the first named inventor, sent via Express Mail Envelope Number EM 117 518 653 US, filed on Jan. 18, 2008, which is currently co-pending, or is an application of which a currently co-pending application is entitled to the benefit of the filing date.

All subject matter of the Related Application and of any and all parent, grandparent, great-grandparent, etc. applications of the Related Applications is incorporated herein by reference to the extent such subject matter is not inconsistent herewith.

TECHNICAL FIELD

The present invention generally relates to the field of display formation, and more particularly to planar item alignment for display formation.

BACKGROUND

Liquid crystal display (LCD) devices and displays often require substrates to be optically coupled to a display surface. Further, LCD devices and other displays may utilize additional substrates to be optically coupled to the already formed display surface. These additional substrates can serve many purposes including optical enhancements, protection from impact, or environmental concerns, or sometimes to improve thermal operating range, such as heating elements. Display components such as modules, cover glass, heater glass, and adhesives generally require proper alignment for lamination. Specifically, proper alignment may be required within a mechanical structure, housing, or bezel, or, in some instances, for display feature alignment. Many times, however, these components may not share a common datum or equal edge lengths.

SUMMARY

The disclosure is directed to an alignment system and method for alignment.

The alignment system may comprise a datum calculator suitable for calculating at least one datum of each planar item of a plurality of planar items, a tooling system comprising a location determiner suitable for locating at least one datum of each planar item of the plurality of planar items, for calculating the proper alignment position for the plurality of planar items, and for instructing the tooling system how to form the tooling aid; and a tooling aid formed by the tooling system suitable for positioning the plurality of planar items in a planar substrate lamination apparatus to provide the proper alignment position when inserted in the planar substrate lamination apparatus.

The alignment system may comprise a first pre-engineered planar item, said first pre-engineered planar item comprising at least one first pre-calculated datum; a second pre-engineered planar item, said second pre-engineered planar item comprising at least one second pre-calculated datum; a tooling system comprising a location determiner suitable for locating the first pre-calculated datum and the second pre-calculated datum, for calculating the proper alignment position for the first pre-engineered planar item and the second pre-engineered planar item, and for instructing the tooling system how to form the tooling aid; and a tooling aid formed by the tooling system suitable for positioning the first planar item and the second planar item in a planar substrate lamination apparatus to provide the proper alignment position when inserted in the planar substrate lamination apparatus. Alignment system may be substantially manually operated, substantially automated or operable via a combination of manual and automated operation.

The method for alignment may comprise locating fiducial alignment markers, the fiducial alignment markers attached to at least two planar items and aligning the planar items to the proper alignment position by optically aligning the fiducial alignment markers.

The method for alignment may comprise calculating the proper alignment position for a plurality of planar items based on at least one datum per planar item of the plurality of planar items, instructing a tooling system to form a tooling aid for providing the proper alignment position in a planar substrate lamination apparatus, and inserting the tooling aid into the planar substrate lamination apparatus for the proper alignment of the plurality of planar items in the planar substrate lamination apparatus.

It is to be understood that both the foregoing general description and the following detailed description are exemplary and explanatory only and are not necessarily restrictive of the claims. The accompanying drawings, which are incorporated in and constitute a part of the specification, illustrate examples and together with the general description, serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1B:
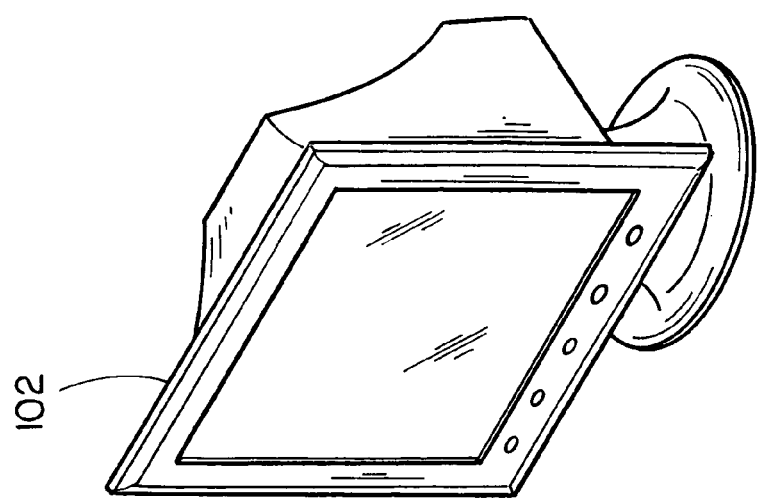
FIG. 1B is an isometric view illustrating a display.
Figure 1A:
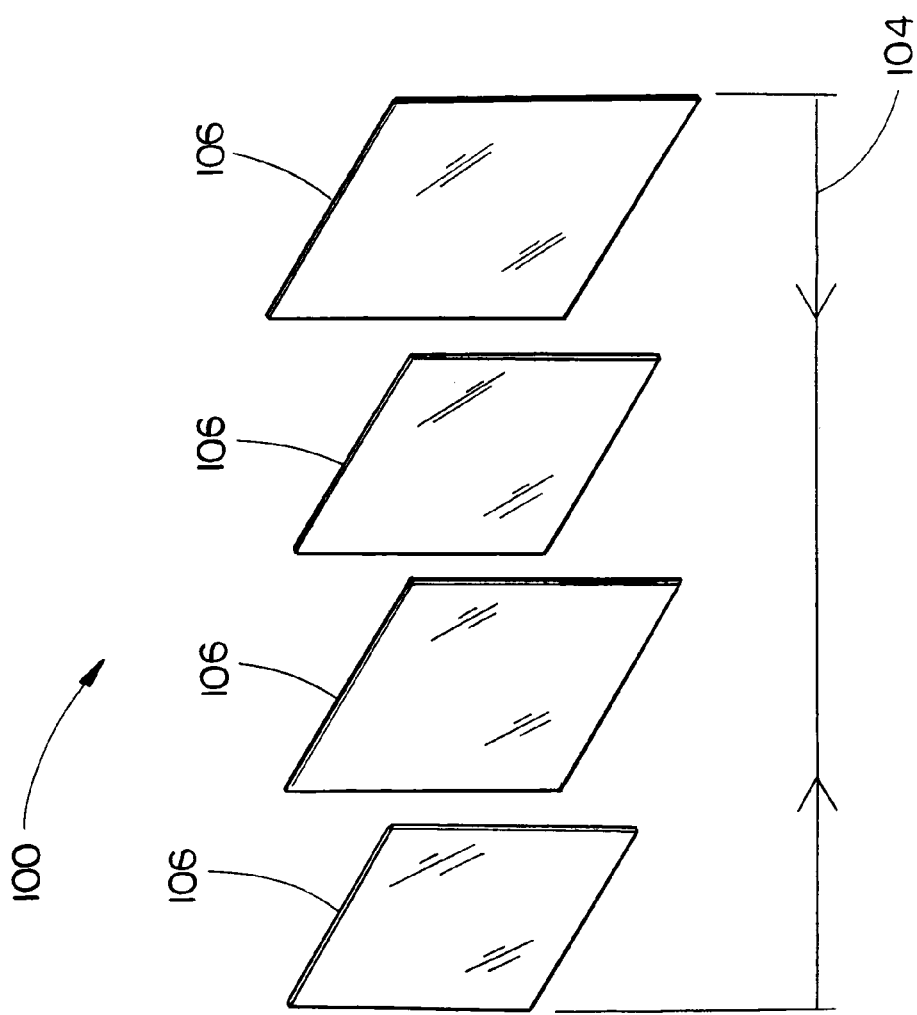
FIG. 1A is an exploded isometric view illustrating a plurality of substrates utilized form a display.

Referring to FIG. 1A, an exploded isometric view of a plurality of substrates utilized to form a display 100 is shown. Referring to FIG. 1B, an isometric view of a display monitor 102 is shown. A "substrate" as used herein refers to any rigid or semi-rigid planar surface of glass, plastic, film, and/or metal. A "substrate" as used herein may further refer to any rigid or semi-rigid planar surface of glass, plastic, film, and/or metal coated with an adhesive. The substrates 106 are aligned, brought together 104, and then laminated to form a display 102. A laminated display 102 may comprise an anti-reflective/anti-glare substrate, a touch panel, a glass substrate, a polarizing film substrate, an LCD, an electrode plane including a conductive coating (e.g., indium-tin oxide) substrate, another glass substrate, and/or another polarizing film substrate. The substrates 106 may be different materials, different shapes, different thickness, and/or different sizes. The different substrates 106 may be aligned for lamination to form the display 102.

Figure 2:
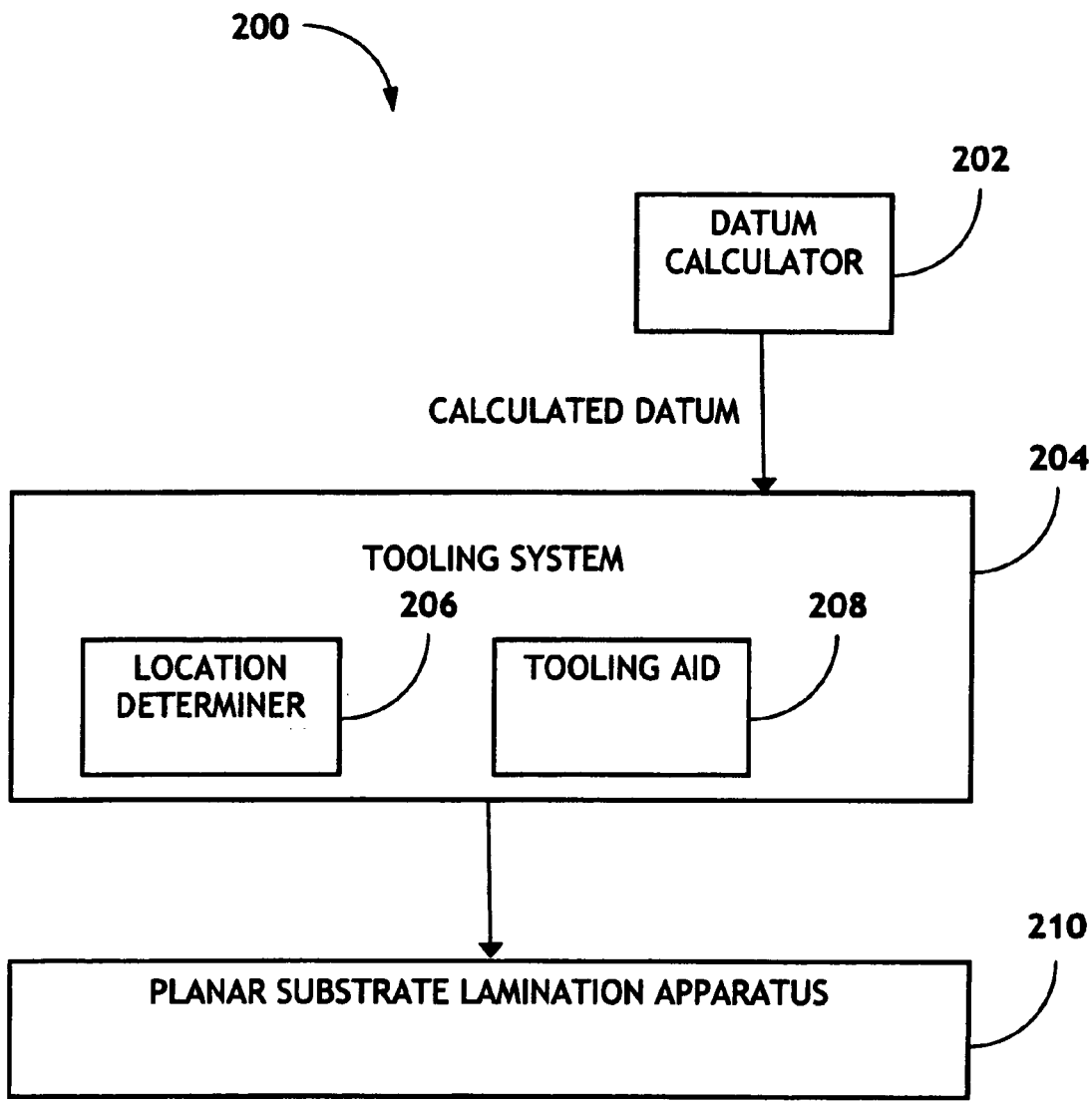
FIG. 2 is a block diagram illustrating an alignment system.
Figure 3:
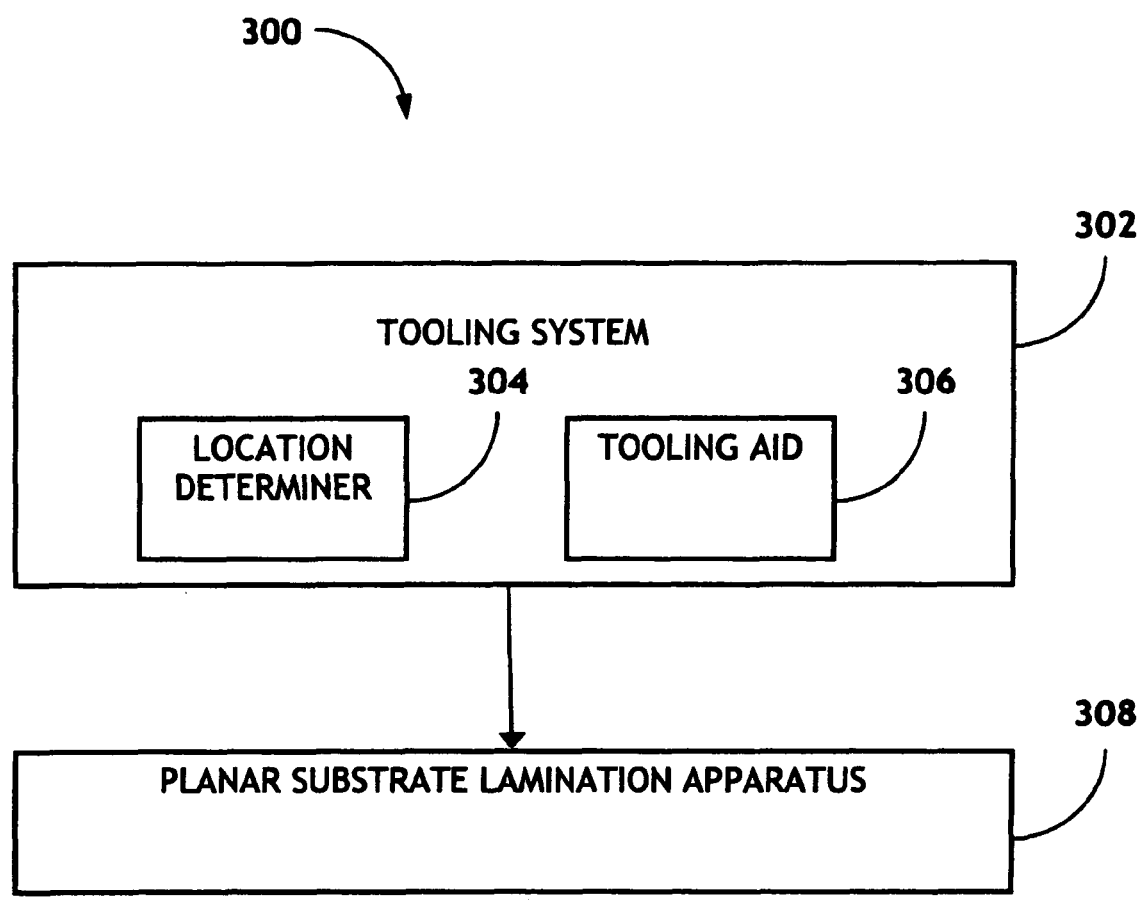
FIG. 3 is a block diagram illustrating an alignment system.
Figure 4:
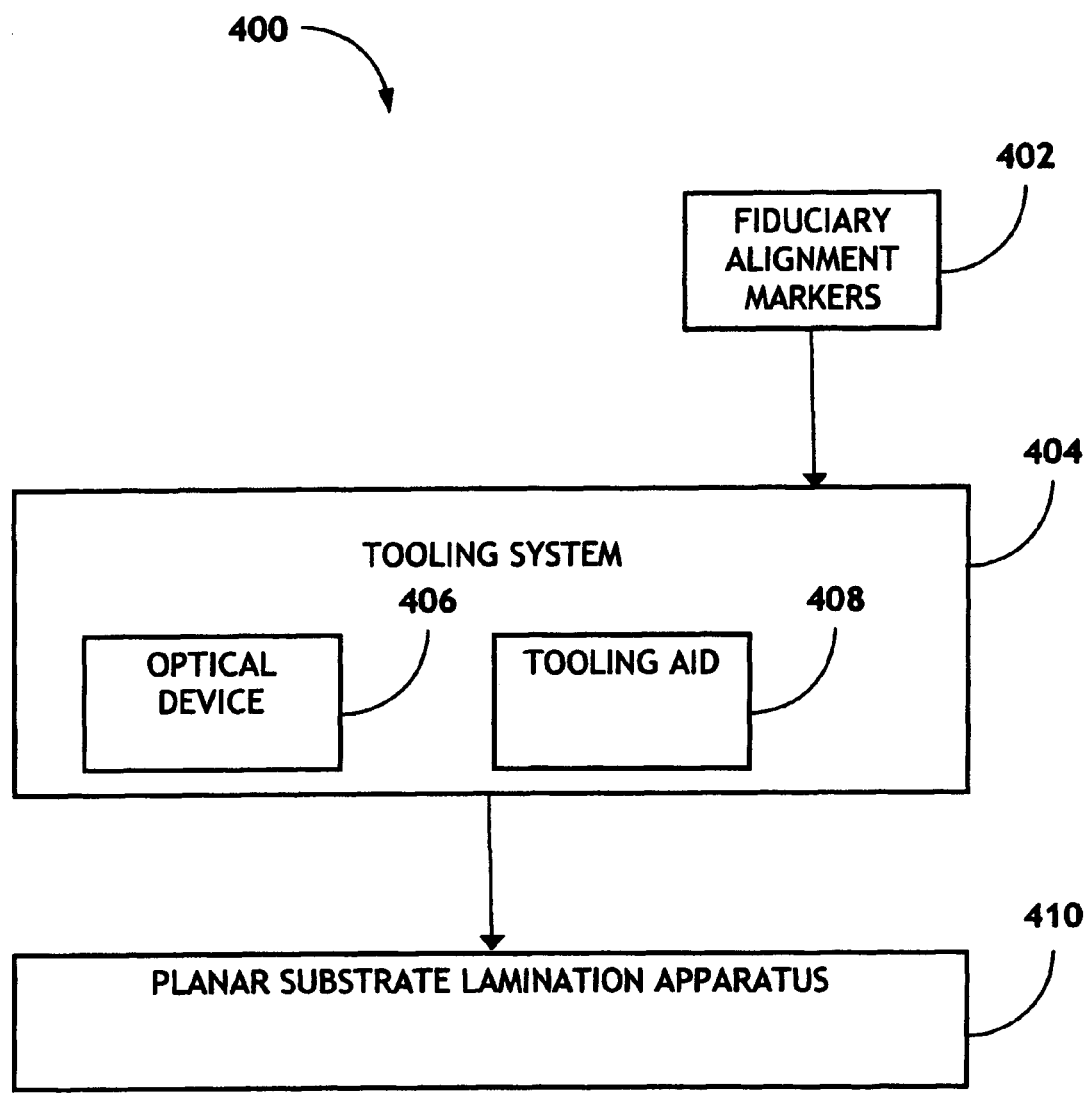
FIG. 4 is a block diagram illustrating an alignment system.

Referring to FIGS. 2 through 4, a block diagram of an alignment system is shown. The alignment system may be utilized to form a display or to add additional substrates to an already formed display. As used herein a "planar item" refers to a substrate or a display. The display is formed by the lamination of multiple substrates. Additional substrates are added to an already formed display by lamination also. The planar items are aligned before lamination. The number and/or types of substrates vary depending upon the desired display. Three different alignment systems 200, 300, and 400 may be utilized to align the planar items for lamination to form a display or to add an additional substrate to an already formed display.

Referring to FIG. 2 a block diagram of an alignment system 200 is shown. A datum calculator 202 may calculate a datum of a planar item. The term "datum" as used herein refers to a reference edge length on each planar item. The datum calculator may calculate a plurality of datum for each planar item. The datum calculator 102 may mechanically, optically, and/or manually calculate one or more datum. The number and type of substrates vary depending upon the desired display. At least two planar items must be present to utilize the alignment system 200. A calculated datum may be provided to the tooling system 204. The calculated datum may be provided to the tooling system electronically, mechanically, and/or manually. The datum may be entered manually and/or robotically through a keyboard or electronically via an electronic signal and/or a communication system.

The tooling system utilizes a location determiner 206 to calculate a proper alignment position for the planar items. The location determiner 206 may utilize computing systems, environments, and/or configurations that may be suitable for utilization with location software and/or hardware, such as personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like. This list is not restrictive. It is contemplated that any suitable computing systems, environments, and/or configurations may be utilized without departing from the scope and intent of the disclosure. The location determiner 206 may utilize the calculated datum or the edge lengths to determine the proper alignment position. The location determiner 206 may utilize a plurality of datum. The multiple datum allow a tooling system 204 to determine the correct vertical and horizontal alignment position for the planar items. The location determiner 206 provides instruction to the tooling system 204 for forming a tooling aid 208 and/or tooling aids 208 to properly align the planar items in a planar substrate lamination apparatus 210 for lamination. The tooling system 204 utilizes the instructions to form the tooling aids 208 and/or insert the tooling aids 208 into the planar substrate lamination apparatus 210. As used herein "to form tooling aids" or "forming tooling aids" refers to the specific calculated placement of tooling aid(s) inside of a planar substrate lamination apparatus, to the calculated design of a tooling aid(s), and/or the proper selection of an already formed tooling aid(s).

Figure 7:
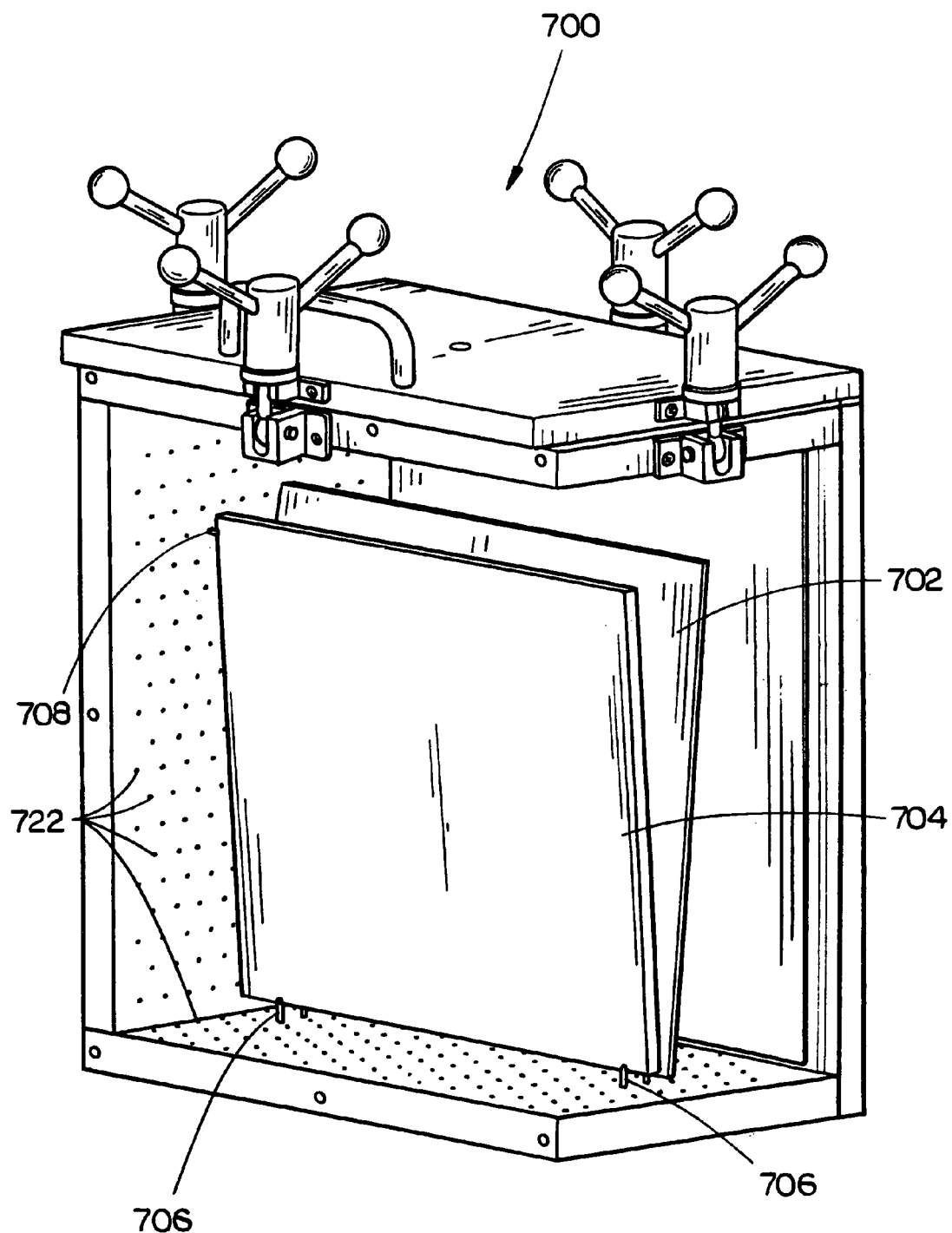
FIG. 7 is a partial isometric view illustrating a vertical planar substrate lamination apparatus.
Figure 8:
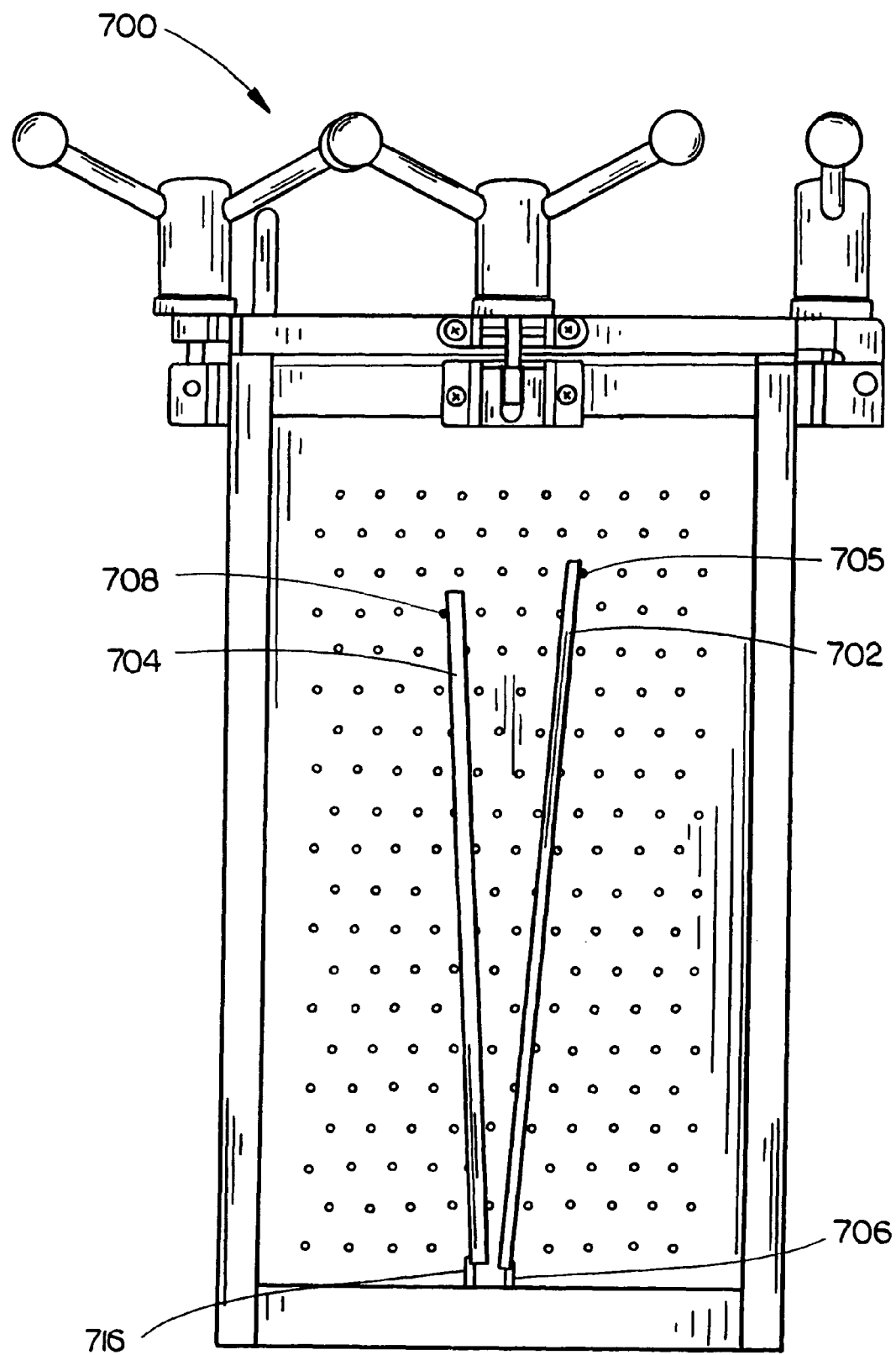
FIG. 8 is a cross-sectional side view illustrating a vertical planar substrate lamination apparatus.
Figure 9:
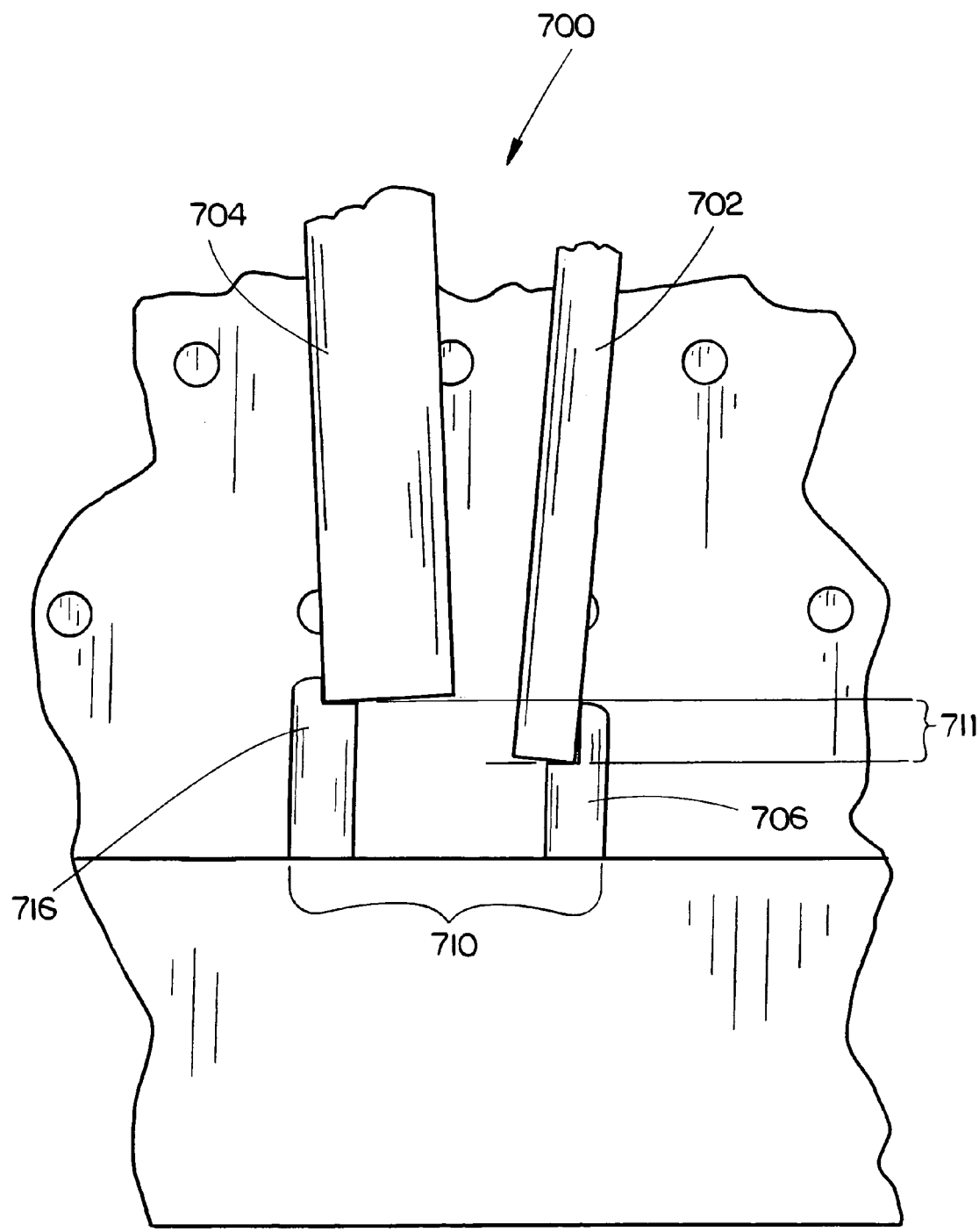
FIG. 9 is a partial cross-sectional side view illustrating a vertical planar substrate lamination apparatus.

Referring to FIGS. 7, 8, and 9 a planar substrate lamination apparatus 700 is shown. The planar substrate lamination apparatus 700 may comprise at least one support peg 708 and at least one stand-off 706. The planar substrate lamination apparatus 700 may utilize a support peg 708 and a standoff 706 to align a first substrate 702 and a second substrate 704 for lamination. The first substrate 702 and the second substrate 704 may be different sizes. The first substrate 702 and the second substrate 704 may be formed from the same or different materials. The stand off 706 may provide a controlled offset 710 and separation 711 prior to lamination for the first substrate 702 and the second substrate 704, as illustrated in FIG. 9.

Figure 13:
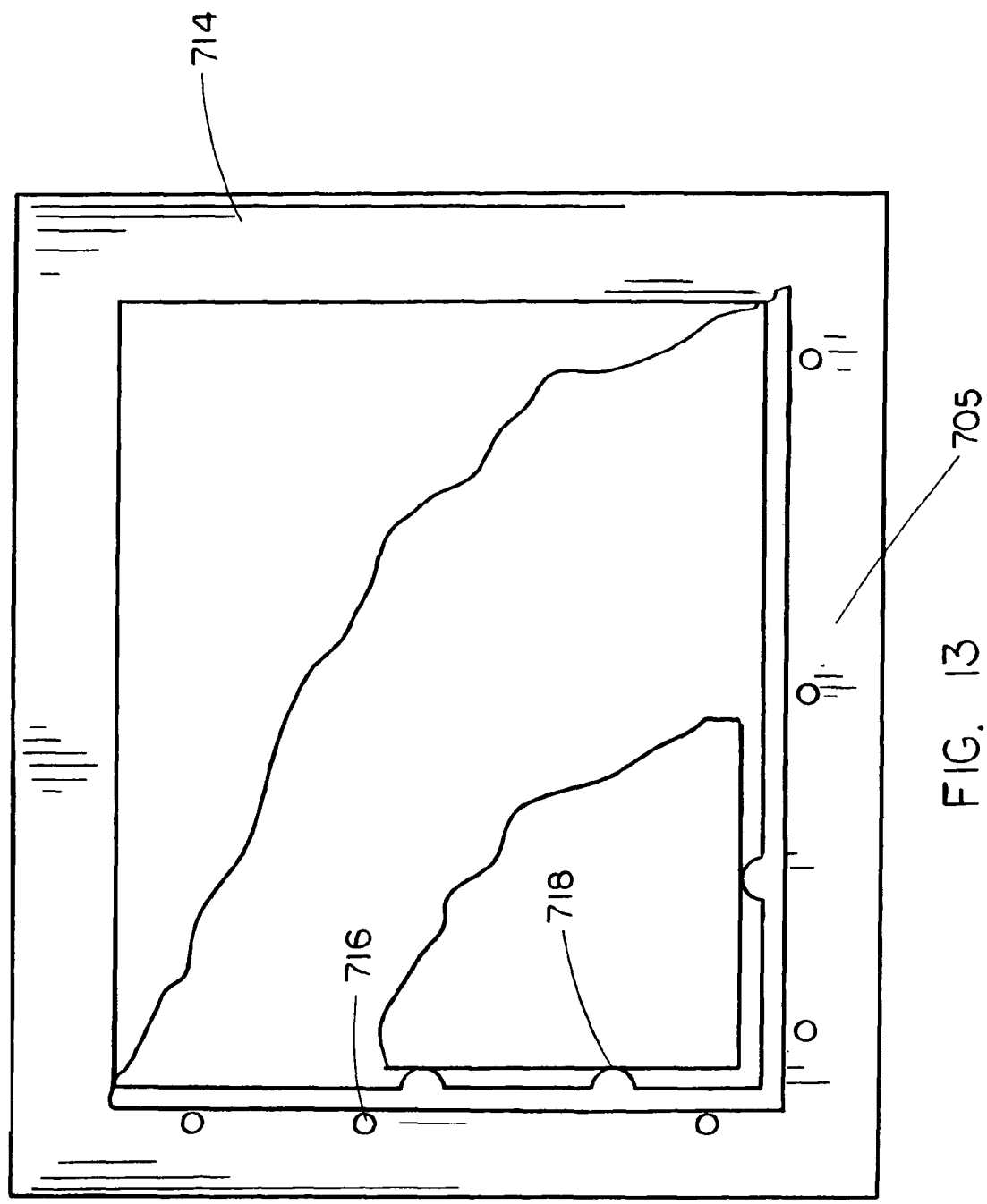
FIG. 13 is a top view of an alignment aid for a planar substrate lamination apparatus.
Figure 14:
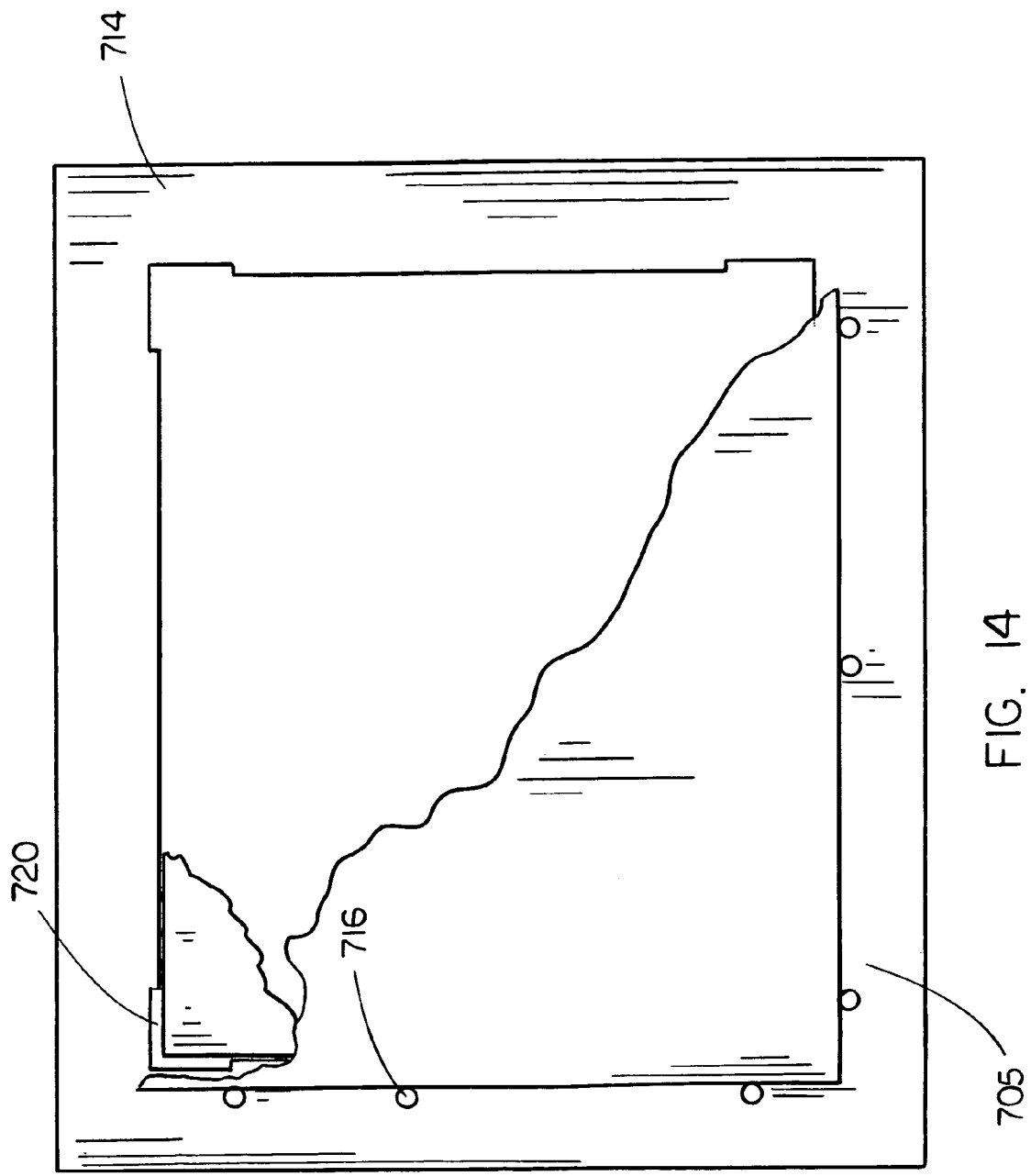
FIG. 14 is a top view of an alignment aid for a planar substrate lamination apparatus.

In one embodiment, a tooling aid 208 may comprise an alignment aid 714, as illustrated in FIGS. 13 and 14, and/or pegs 716, as illustrated in FIGS. 7,8, and 9, depending upon the type of the planar substrate lamination apparatus 210 utilized. The tooling aid 208 may offset the uncommon datum of the planar items (if the planar items have uncommon datum) when the planar items are placed inside the planar substrate lamination apparatus 210 for lamination. Tooling aid 705 may be utilized as an edge support for a substrate 702, 704. A single tooling aid 706 or multiple tooling aids 706, 716 may be utilized to provide the proper alignment of planar items for lamination. The tooling aid 208 may offset the different sizes, shapes, or thicknesses of the planar items by utilizing pegs 706, 716, bumps 718, and/or any other suitable mechanism for specifically positioning a planar item within the planar substrate lamination apparatus. The tooling aid 705 may be inserted and/or positioned inside the planar substrate lamination apparatus for specifically providing angular support for a planar item within the planar substrate lamination apparatus. The tooling aid 706, 716 may be adaptable to required electrostatic discharge (ESD) thresholds for sensitive electronics. For example, at least a portion of a tooling aid may be composed of a static dissipative material configured to conduct static charge away from the planar substrate lamination apparatus 700.

The tooling aid 705 permits adaptation for multiple planar items with one common tool. Specifically, as mentioned, tooling aid 705 may be utilized as an edge support for a substrate 702, 704.

Tooling aid 720 may provide clearance substantially around a corner region of a substrate. Clearance provided by tooling aid 720 may reduce or substantially prevent damage to a substrate when a substrate is loaded, laminated to at least one additional substrate, removed from an insert or transported within the alignment system.

Figure 12A:
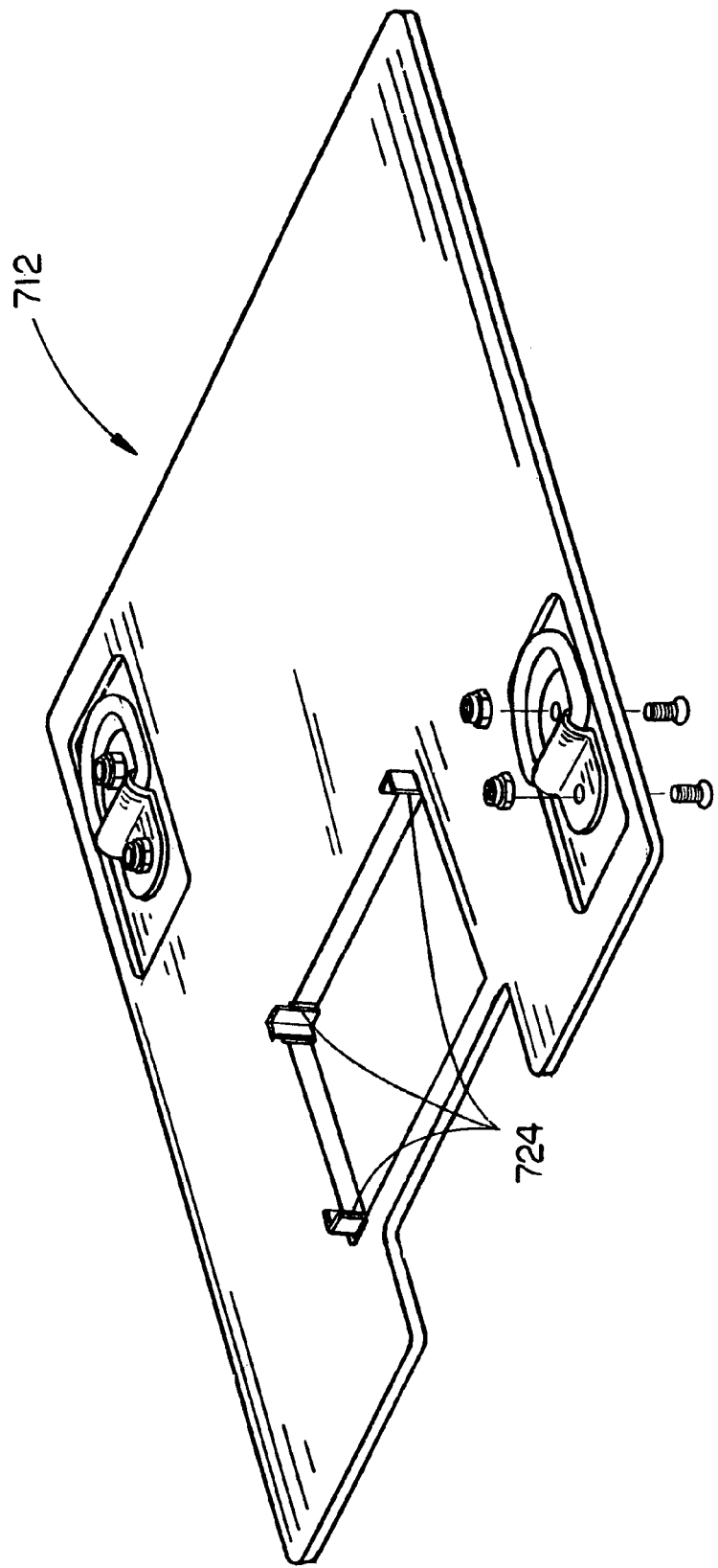
FIG. 12A is an isometric view illustrating an insert holder for a horizontal planar substrate lamination apparatus.
Figure 12B:
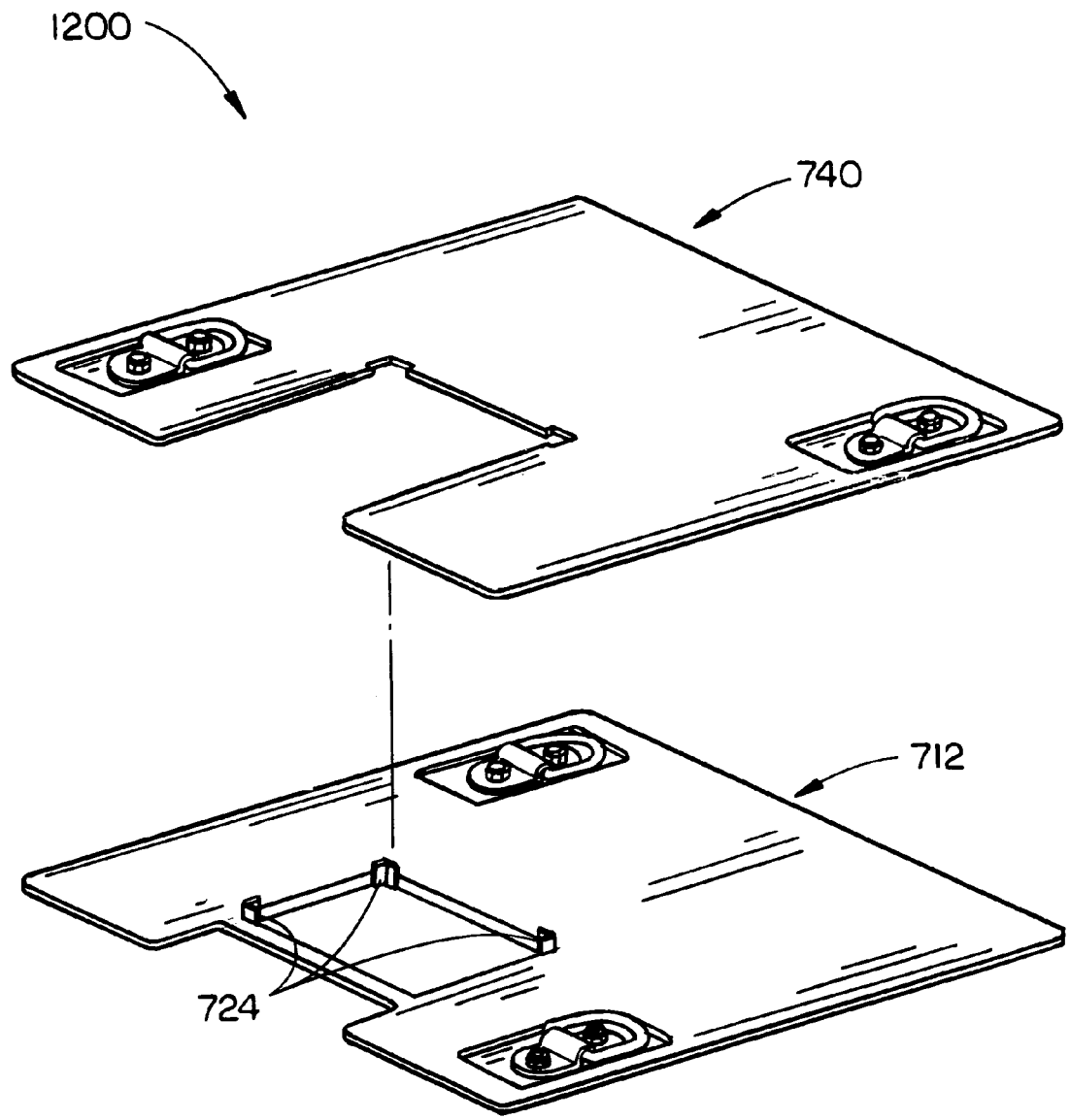
FIG. 12B is an isometric view illustrating an insert holder and a mask for a horizontal planar substrate lamination apparatus.

The tooling system may provide the proper alignment position to the planar substrate lamination apparatus by forming a tooling aid, such as an insert 712, as illustrated in FIGS. 12A, 12B and 13. The insert 712 may be made of metal, a polymer, and/or multiple polymers. The insert 712 is designed based upon the specifications provided by the location determiner 206 to provide for the proper alignment position of the planar items for lamination. The insert 712 may be inserted and/or positioned inside the planar substrate lamination apparatus. The planar items are placed inside of the insert 712. The specific placement of the pegs 716, bumps 718, and/or any other suitable mechanism for specifically positioning a planar item align the planar items into the proper position for lamination in the insert 712. The insert 712 filled with planar items may be inserted into the planar substrate lamination apparatus.

The tooling system may utilize pegs 706, 716 in a peg system (e.g., array of apertures 722) to provide the proper alignment position to the planar items in the planar substrate lamination apparatus 700, as illustrated in FIGS. 7, 8, and 9. The pegs 706, 716 may function as standoffs and/or support pegs. The pegs 706, 716 are inserted in the planar substrate lamination apparatus in a specific position to provide the planar items with the proper position for lamination. The pegs 706, 716 may also be specifically designed and/or shaped to provide the proper compensation and/or positioning of the planar items. The pegs 706, 716 may have different sizes, lengths, and/or cut out notches to align the planar items. The different sizes, lengths, and/or cut out notches may be utilized to offset the different sizes, shapes, and/or thicknesses of the planar items. After the pegs 706, 716 are designed and inserted into the planar substrate lamination apparatus 700 the planar items may be placed in the planar substrate lamination apparatus 700. The pegs 706, 716 place the planar items in the planar substrate lamination apparatus 700 in the proper position for lamination.

Figure 10:
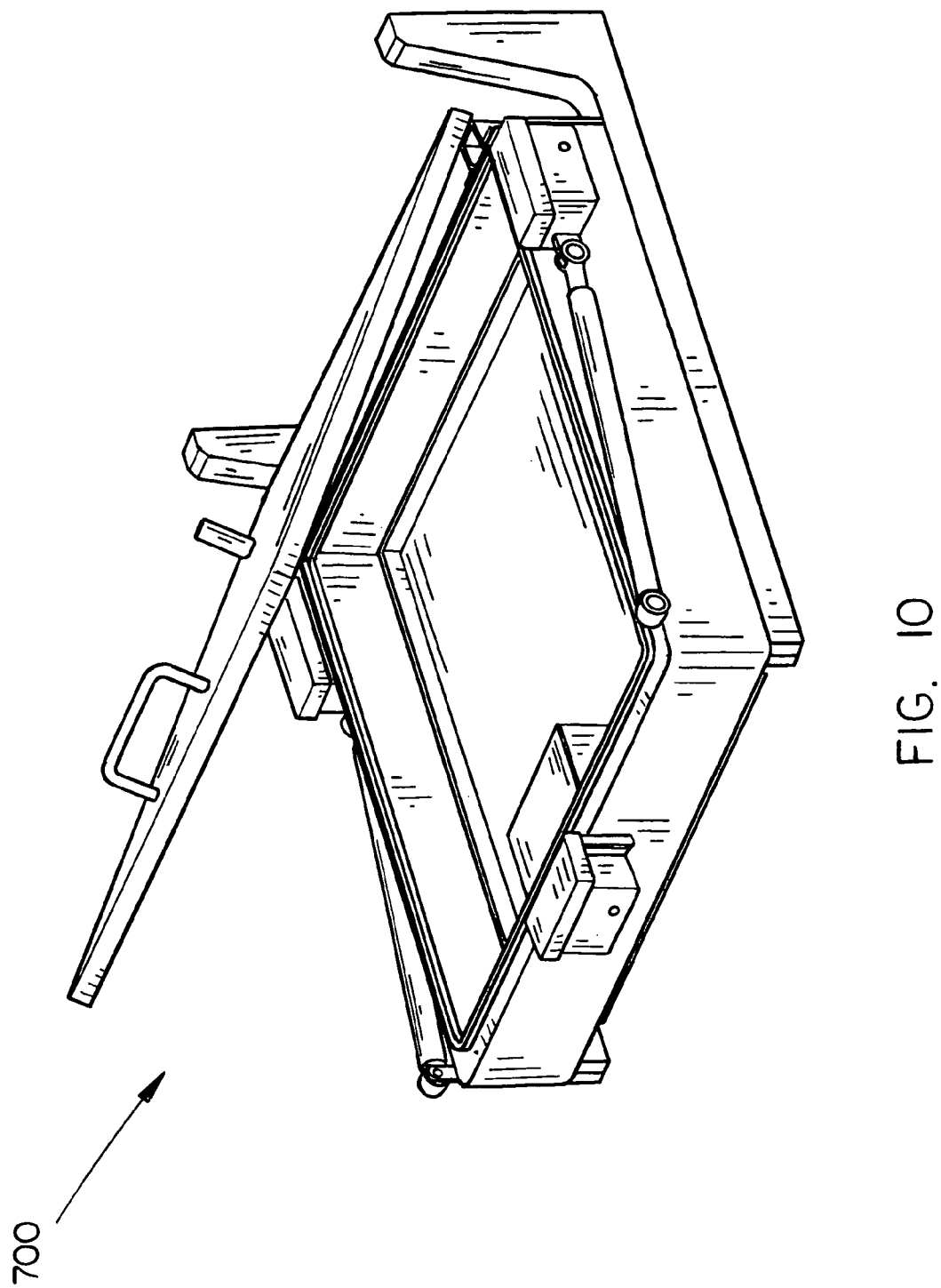
FIG. 10 is an isometric view illustrating a horizontal planar substrate lamination apparatus.
Figure 11:
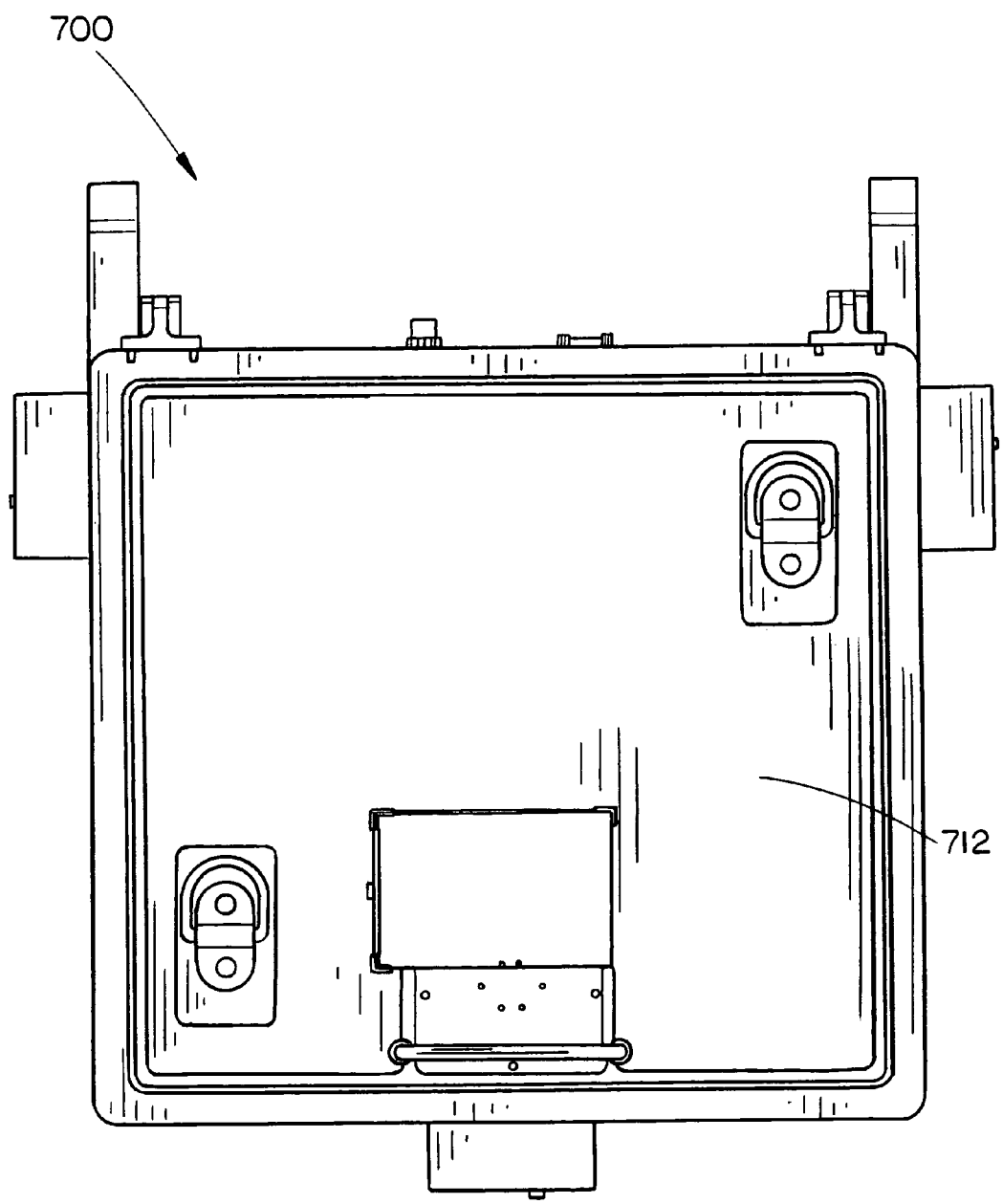
FIG. 11 is a partial top view of a horizontal planar substrate lamination apparatus with an insert holder.

Referring to FIGS. 10 and 11 a horizontal planar substrate lamination apparatus 700 is shown. The planar substrate lamination apparatus 700 may comprise an insert 712, as illustrated in FIGS. 11, 12A and 12B. It is further contemplated that, in an implementation utilizing, for example, at least one bladder to provide uniform pressure to a laminated substrate assembly, a planar substrate lamination apparatus insert 712 may be configured to hold a laminated assembly (e.g. display) in place. In such an embodiment, a pressure may be applied to an interior cavity of the horizontal planar substrate lamination apparatus 700. Such interior cavity pressure may be higher than a pressure applied, for example, to keep one or more substrates in place.

Referring to FIG. 12B, a mask 740 may provide additional functions, such as protecting peripheral appendages and accessories of the planar substrates from bladder damage (e.g., in a system where pressure may be applied to the system via one or more bladders) during lamination in the planar substrate lamination apparatus 700. The mask 740 may be positioned above the insert 712 within an alignment system. The mask 740 may comprise a substantially planar mask body defining a mask aperture. The mask aperture may be configured so as to fit around at least one substrate alignment guide 724. For example, the mask aperture may comprise alignment guide aperture portions which may allow the mask 740 to be secured substantially about at least one substrate alignment guide 724. The mask 740 may serve to protect portions of a substrate that may be beyond the periphery of the mask aperture.

Referring to FIGS. 13 and 14 a front view of an alignment aid 714 is shown. The alignment aid 714 offsets the uncommon datum of the planar items when the planar items are placed inside the planar substrate lamination apparatus for alignment 700. The alignment aid 714 may offset the different sizes, shapes, and/or thicknesses of the planar items by utilizing pegs 716, bumps 718, and/or any other suitable mechanism for specifically positioning a planar item within the planar substrate lamination apparatus.

The planar items may be placed in the tooling aid, such as an alignment aid prior to inserting the alignment aid into the alignment aid holder in the planar substrate lamination apparatus. The tooling aid 208 may be placed inside of the planar substrate lamination apparatus 210 before the planar items may be placed into the planar substrate lamination apparatus 210 for lamination. The order and/or sequence of configuration may depend upon the type of alignment system utilized, type of tooling aid utilized, and/or the type of planar substrate lamination apparatus utilized.

The planar substrate lamination apparatus 210 may be a vertical planar substrate lamination apparatus 700, as illustrated in FIGS. 7 and 8. The planar substrate lamination apparatus 210 may be a horizontal planar substrate lamination apparatus 700 as illustrated in FIGS. 10 and 11. Both planar substrate lamination apparatuses 700 (vertical and horizontal) may require the proper vertical and horizontal positioning of the planar items. The planar substrate lamination apparatus 210 and the tooling system 204 may utilize robotic handling technology and/or systems. The functions of the planar substrate lamination apparatus 210 and the tooling system 204 may also be manually performed. The tooling system 204 essentially directs the planar substrate lamination apparatus's placement of the planar items. The proper alignment of the substrates may provide for proper registration between mating substrates.

Referring to FIG. 3 a block diagram of an alignment system 300 is shown. Each type of planar item may be pre-engineered into a desired size, shape, and/or thickness making the datum the same for each planar item of that type. Therefore, the datum is known for each type of planar item. The pre-calculated datum may be sent to a tooling system 302. The tooling system 302 utilizes the pre-calculated datum and a location determiner 304 to determine the proper alignment positions of the planar items. The location determiner 304 locates the pre-calculated datum and instructs the tooling system how to properly form the tooling aids 306 to provide the planar substrate lamination apparatus 308 with the proper alignment position for the planar items.

Figure 15:
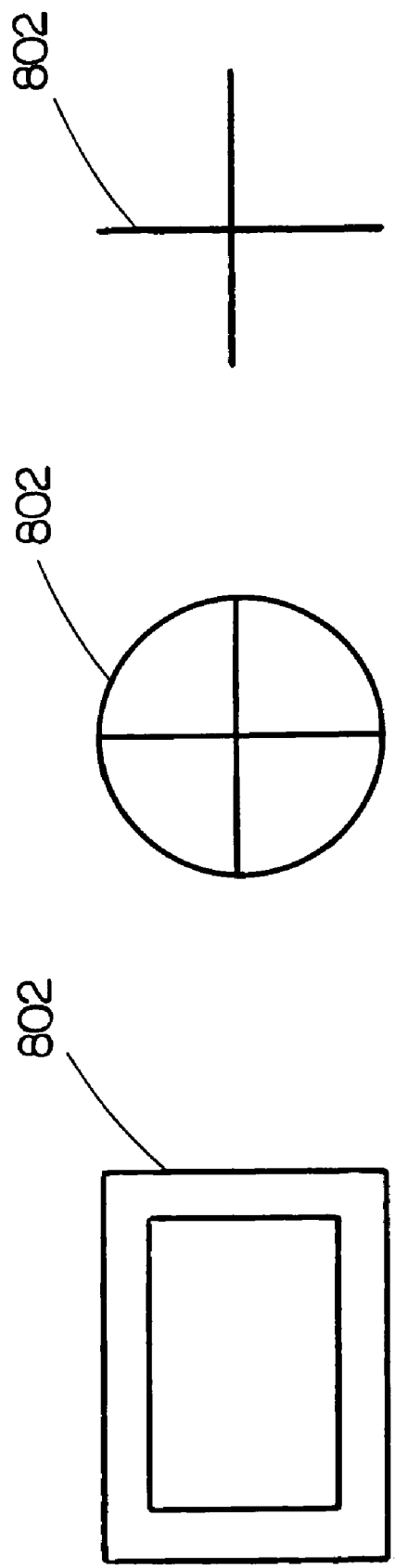
FIG. 15 is a front view of a plurality of fiducial alignment markers.

Referring to FIG. 4 a block diagram of an alignment system 400 is shown. Planar items may be marked with at least one fiducial alignment marker 402. A fiducial alignment marker 402 may be any desired shape, symbol, and/or marking. For instance, a fiducial alignment marker 402 may include, but may not be limited to, at least one of the symbols 802 shown in FIG. 15. It is contemplated that any suitable fiducial alignment symbol may be utilized without departing from the scope and intent of the disclosure. A fiducial alignment marker 402 may be placed on the planar items to mark a desired reference point. The fiducial alignment marker 402 may be placed on the planar items in a predetermined position, unlike the datum, which are calculated. The tooling system 404 may locate a fiducial alignment marker 402 by utilizing a location determiner, such as the location determiner 206 as described in FIG. 2. The fiducial marker may be recognized, and/or read by an optical device 406 such as a laser, light, or camera sensor. The tooling system 404 may then determine the proper alignment position for the planar items by aligning the fiducial alignment marker 402. The tooling system 404 utilizes the proper alignment position to provide the planar substrate lamination apparatus 410 with proper alignment position for the planar items by forming the proper tooling aid 408. The tooling aid is inserted into the planar substrate lamination apparatus 410 to provide the proper alignment of the planar items in the planar substrate lamination apparatus 410.

Figure 5:
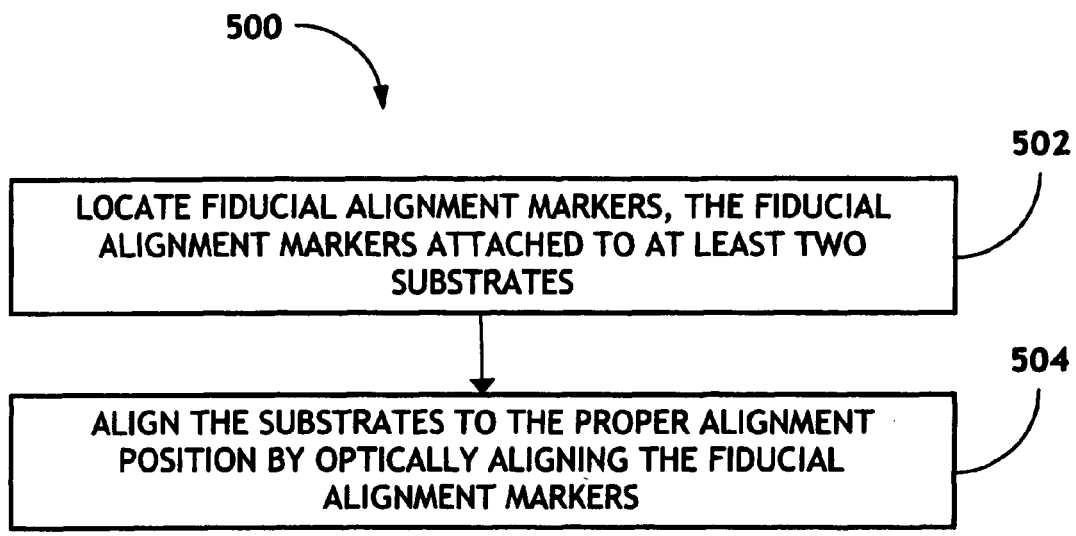
FIG. 5 is a method diagram illustrating a method for alignment.

Referring to FIG. 5 a method diagram of a method for alignment 500 is shown. Method 500 locates at least one fiducial alignment marker, the at least one fiducial alignment marker may be attached to at least two substrates, (e.g. the plurality of planar items 502). Method 500 may align the at least two substrates to the proper alignment position by optically aligning the at least one fiducial alignment marker, 504. Method 500 may be performed by the system 400 disclosed above.

Figure 6:
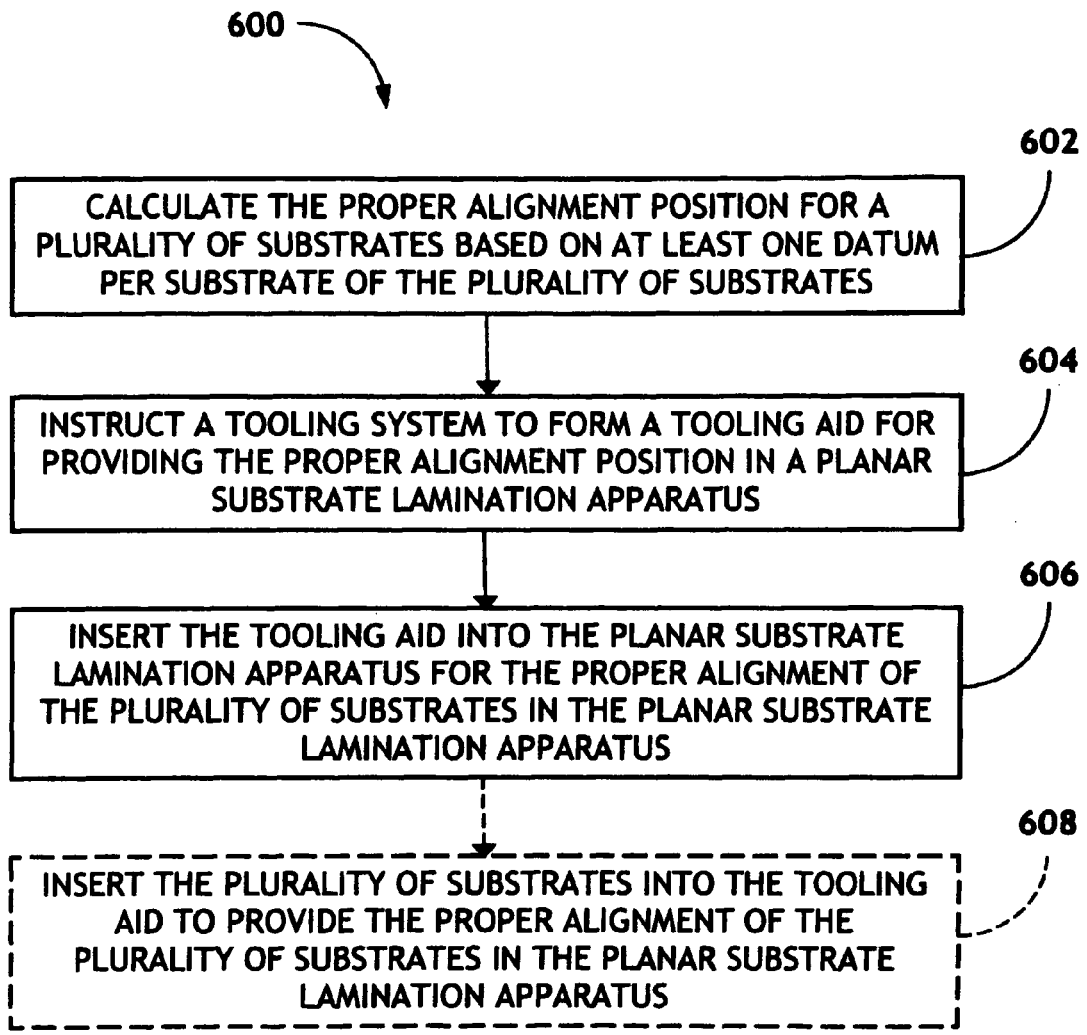
FIG. 6 is a method diagram illustrating a method for alignment.

Referring to FIG. 6 a method diagram of a method for alignment 600 is shown. Method 600 calculates the proper alignment position for a plurality of planar items based on at least one datum per planar item of the plurality of planar items, 602. Method 600 instructs a tooling system to form a tooling aid for providing the proper alignment position in a planar substrate lamination apparatus, 604. Method 600 inserts the tooling aid into the planar substrate lamination apparatus for the proper alignment of the plurality of planar items in the planar substrate lamination apparatus, 606. Method 600 may further insert the plurality of planar items into the tooling aid to provide the proper alignment of the plurality of planar items in the planar substrate lamination apparatus, 608. Method 600 may further comprise pre-engineering the plurality of planar items to a desired size. Method 600 may further comprise mechanically calculating the at least one datum for each of the planar items. Method 600 may further comprise optically calculating the at least one datum for each of the planar items. Method 600 may be performed by the systems 200 and 300 disclosed above.

Systems and apparatuses in accordance with various aspects of the present invention provide a system and method for laminating substrates. In this regard, the present invention may be described herein in terms of functional block components and various processing steps. It should be appreciated that such functional blocks may be realized by any number of hardware, firmware, and/or software components configured to perform the specified functions. For example, the present invention may employ various integrated circuit components, e.g., memory elements, digital signal processing elements, look-up tables, and the like, which may carry out a variety of functions under the control of one or more microprocessors or other control devices. Such general techniques and components that are known to those skilled in the art are not described in detail herein. Furthermore, although the invention is frequently described herein as pertaining to displays composed of one or more substrates, it will be appreciated that the systems and methods described herein could also be applied to any substrates adhered with any adhesive including, but not limited to, a pressure sensitive adhesive.

The methods disclosed may be implemented as sets of instructions, through a single production device, and/or through multiple production devices. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the disclosure. The accompanying method claims present elements of the various steps in a sample order, and are not necessarily meant to be limited to the specific order or hierarchy presented.

It is believed that the present invention and many of its attendant advantages will be understood by the foregoing description, and it will be apparent that various changes may be made in the form, construction and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. An alignment system, comprising:
  a datum calculator suitable for calculating an edge length for at least one datum of each planar item of a plurality of planar items;
  a tooling system comprising a location determiner suitable for locating the at least one datum of each planar item of the plurality of planar items within a planar substrate lamination apparatus, for calculating a proper alignment position for the plurality of planar items, and for instructing the tooling system how to form a tooling aid;

wherein the tooling aid formed by the tooling system is suitable for positioning the plurality of planar items in the planar substrate lamination apparatus to provide the proper alignment position when inserted in the planar substrate lamination apparatus.

2. The alignment system as claimed in claim 1, further comprising the planar substrate lamination apparatus suitable for aligning the plurality of planar items for lamination by utilizing the inserted tooling aid.

3. The alignment system as claimed in claim 2, wherein the alignment system utilizes at least one of manual handling or automated handling.

4. The alignment system as claimed in claim 1, wherein the proper alignment position is suitable for providing proper registration of mating between the plurality of planar items.

5. An alignment system, comprising:
a first pre-engineered planar item, said first pre-engineered planar item comprising at least one first pre-calculated datum;
a second pre-engineered planar item, said second pre-engineered planar item comprising at least one second pre-calculated datum;
a tooling aid;
a tooling system comprising a location determiner suitable for locating the first pre-calculated datum and the second pre-calculated datum, for calculating a proper alignment position for the first pre-engineered planar item and the second pre-engineered planar item, and for instructing the tooling system how to form the tooling aid; and
a vertical planar substrate lamination apparatus suitable for vertically aligning the first pre-engineered planar item and the second pre-engineered planar item for lamination by utilizing the tooling aid;
wherein the tooling aid formed by the tooling system is suitable for positioning the first planar item and the second planar item in the vertical planar substrate lamination apparatus to provide the proper alignment position when inserted in the vertical planar substrate lamination apparatus.

6. The alignment system as claimed in claim 5, wherein the alignment system utilizes at least one of manual handling or automated handling.

7. The alignment system as claimed in claim 5, wherein the proper alignment position is suitable for providing proper registration of mating between the first pre-engineered planar item and the second pre-engineered planar item.

8. An alignment system, comprising:
at least one fiducial alignment marker suitable for attaching to each planar item of a plurality of planar items;
a tooling aid;
a tooling system suitable for locating and aligning the at least one fiducial alignment marker for properly forming the tooling aid; and
a vertical planar substrate lamination apparatus suitable for aligning the plurality of planar items for lamination by utilizing the tooling aid;
wherein the tooling aid formed by the tooling system is suitable for positioning the plurality of planar items to provide the proper vertical and horizontal alignment position in the planar substrate lamination apparatus when inserted in the planar substrate lamination apparatus.

9. The alignment system as claimed in claim 8, further comprising an optical device suitable for aligning the fiducial alignment markers in the tooling system.

10. The alignment system as claimed in claim 8, wherein the alignment system utilizes at least one of manual technology or automated technology.

11. The alignment system as claimed in claim 8, wherein the proper alignment position is suitable for providing proper registration of mating between the plurality of planar items.

12. A method for alignment, comprising:
locating fiducial alignment markers, the fiducial alignment markers attached to at least two planar items;
aligning the planar items to a proper alignment position by optically aligning the fiducial alignment markers; and
positioning the planar items at least partially within an aperture of a mask member, the mask member having a body portion, the body portion configured to protect portions of the planar items extending beyond the periphery of the planar items.

13. The method as claimed in claim 12, further comprising pre-engineering the planar items to a desired size.

14. The method as claimed in claim 12, further comprising attaching the fiducial alignment markers to the center-point of the at least two planar items.

15. A method for alignment, comprising:
calculating a proper alignment position for a plurality of planar items based on at least one datum per planar item of the plurality of planar items;
instructing a tooling system to form a tooling aid for providing the proper alignment position in a planar substrate lamination apparatus; and
inserting the tooling aid into the planar substrate lamination apparatus for the proper alignment of the plurality of planar items in the planar substrate lamination apparatus;
positioning the plurality of planar items at least partially within an aperture of a mask member, the mask member having a body portion, the body portion configured to protect portions of the planar items extending beyond the periphery of the plurality of planar items.

16. The method as claimed in claim 15, further comprising inserting the plurality of planar items into the tooling aid to provide the proper alignment of the plurality of planar items for lamination in the planar substrate lamination apparatus.

17. The method as claimed in claim 15, further comprising calculating at least one datum for each of the planar items of the plurality of planar items.

18. The method as claimed in claim 15, further comprising pre-engineering each of the planar items of the plurality of planar items to a desired size.

* * * * *